United States Patent
Kooyman et al.

(10) Patent No.: US 10,232,309 B2
(45) Date of Patent: Mar. 19, 2019

(54) METHOD AND DEVICE FOR COOL-DRYING A GAS WITH CIRCULATING COOLING LIQUID WITH BYPASS LINE

(71) Applicant: ATLAS COPCO AIRPOWER, NAAMLOZE VENNOOTSCHAP, Wilrijk (BE)

(72) Inventors: Maarten Kooyman, Wilrijk (BE); Johan Hendrik R. De Herdt, Wilrijk (BE); Frank Jacques E. Roelants, Wilrijk (BE); Frits Cornelis A. Baltus, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 15/308,982

(22) PCT Filed: May 4, 2015

(86) PCT No.: PCT/BE2015/000019
§ 371 (c)(1),
(2) Date: Nov. 4, 2016

(87) PCT Pub. No.: WO2015/168755
PCT Pub. Date: Nov. 12, 2015

(65) Prior Publication Data
US 2017/0065931 A1    Mar. 9, 2017

(30) Foreign Application Priority Data

May 9, 2014  (BE) .................................. 2014/0343
May 9, 2014  (BE) .................................. 2014/0344
May 9, 2014  (BE) .................................. 2014/0348

(51) Int. Cl.
  *B01D 53/26*   (2006.01)
  *F25B 49/02*   (2006.01)
  *F25B 1/00*    (2006.01)

(52) U.S. Cl.
  CPC .............. *B01D 53/265* (2013.01); *F25B 1/00* (2013.01); *F25B 49/02* (2013.01);
  (Continued)

(58) Field of Classification Search
  CPC ....... B01D 53/265; B01D 5/0039; F25B 1/00; F25B 49/02; F25B 2700/2117;
  (Continued)

(56) References Cited

U.S. PATENT DOCUMENTS 6,393,850 B1 * 5/2002 Vanderstraeten .... B01D 5/0039
                                                    62/196.3
6,467,292 B1  10/2002 Praxmarer et al.
(Continued)

FOREIGN PATENT DOCUMENTS

EP    1103296 A1     5/2001
KR    20130105460    9/2013
(Continued)

OTHER PUBLICATIONS

International Search Report (ISR) dated Sep. 17, 2015, for PCT/BE2015/000019.
Written Opinion dated Apr. 8, 2016, for PCT/BE2015/000019.

*Primary Examiner* — Emmanuel Duke
(74) *Attorney, Agent, or Firm* — Bacon & Thomas, PLLC

(57) ABSTRACT

Method for cool drying gas, whereby the cool dryer is characterized by curves that show the setpoint for the evaporator temperature or evaporator pressure for a load as a function of the lowest gas temperature, whereby the method comprises the following steps:—the determination of a curve and Tset or pset as a function of the load that is
(Continued)

required to cool the gas to LATset; the control of a supply of coolant from the compressor to an injection point (P) downstream from the expansion means and upstream from the compressor in order to make the evaporator temperature or evaporator pressure equal to Tset or pset.

28 Claims, 4 Drawing Sheets

(52) U.S. Cl.
CPC ....... *F25B 2400/23* (2013.01); *F25B 2500/19* (2013.01); *F25B 2600/0261* (2013.01); *F25B 2600/2501* (2013.01); *F25B 2600/2513* (2013.01); *F25B 2700/197* (2013.01); *F25B 2700/1933* (2013.01); *F25B 2700/2117* (2013.01); *F25B 2700/21151* (2013.01)

(58) Field of Classification Search
CPC ............ F25B 2400/23; F25B 2700/197; F25B 2600/2501; F25B 2500/19; F25B 2600/2513; F25B 2600/0261; F25B 2700/1933; F25B 2700/21151; F25B 47/022; F25B 49/025; F25B 41/04

See application file for complete search history.

(56) References Cited

U.S. PATENT DOCUMENTS

| | | |
|---|---|---|
| 6,516,622 B1 | 2/2003 | Wilson et al. |
| 2002/0174665 A1 | 11/2002 | Pritchard et al. |
| 2005/0274133 A1* | 12/2005 | Barsanti ................ F25B 41/062 62/225 |
| 2007/0000264 A1* | 1/2007 | Pritchard ............. B01D 53/265 62/208 |
| 2010/0083683 A1 | 4/2010 | Aono |
| 2010/0107674 A1 | 5/2010 | Aono |
| 2011/0138825 A1 | 6/2011 | Chen et al. |
| 2012/0312051 A1 | 12/2012 | Baltus |
| 2013/0180272 A1 | 7/2013 | Ono et al. |

FOREIGN PATENT DOCUMENTS

| | | |
|---|---|---|
| WO | 2011063478 A2 | 6/2011 |
| WO | 2012/065235 A1 | 5/2012 |

* cited by examiner

METHOD AND DEVICE FOR COOL-DRYING A GAS WITH CIRCULATING COOLING LIQUID WITH BYPASS LINE

The present invention relates to a method and device for cool drying a gas.

More specifically, the invention is intended for cool drying gas, whereby water vapour in the gas is condensed by guiding the gas through the secondary section of a heat exchanger whose primary section forms the evaporator of a closed cooling circuit in which a coolant can circulate by means of a compressor that is installed in the cooling circuit after the evaporator and which is followed by a condenser and expansion means through which the coolant can circulate.

BACKGROUND OF THE INVENTION

Cool drying is, as is known, based on the principle that by lowering the gas temperature the moisture in the gas condenses, after which the condensate is separated in a liquid separator and after which the gas is again heated such that this gas is no longer saturated.

It is known that in most cases compressed air, supplied by a compressor for example, is saturated with water vapour or, in other words, it has a relative humidity of 100%. This means that in the event of a temperature drop to below the 'dew point' condensation occurs. Because of the condensed water corrosion occurs in the pipes and tools that draw off compressed air from the compressor, and equipment can present premature wear.

It is consequently necessary to dry this compressed air, which can be done in the aforementioned way by cool drying. Air other than compressed air or other gases can also be dried in this way.

When drying compressed air, the air in the heat exchanger cannot be cooled too much as otherwise the condensate could freeze. Typically the dried compressed air has a temperature equal to two to three degrees above zero or 20° C. below ambient temperature. The coolant temperature in the evaporator is kept at between 15° C. and −5° C. for this purpose.

To prevent the condensate from freezing, as is known, the compressor speed is controlled as a function of the measured lowest gas temperature LAT. The LAT is the lowest occurring temperature of the gas to be dried that is guided through the secondary section of the aforementioned heat exchanger.

If the LAT decreases and the condensate threatens to freeze, for example due to the gas flow decreasing, the compressor speed is reduced such that the LAT increases again.

If the LAT increases, for example due to the gas flow increasing, the compressor speed is increased such that the evaporator temperature falls and the LAT will also fall.

A disadvantage of control on the basis of the LAT is that the evaporator temperature can become too low, such that freezing can occur in the evaporator.

Control on the basis of the evaporator pressure, in other words the pressure in the evaporator, is also known. In such a case the compressor speed is controlled such that the evaporator pressure is maintained between certain limits.

A disadvantage of the aforementioned control is that in the event of a low load of the cooling circuit, or for example with a low supplied gas flow, the condensate can freeze.

Another additional disadvantage of control by means of controlling the speed of the compressor is that a compressor always has to be used whose speed can be adjusted.

Moreover, the speed of such a compressor must always be kept within certain limits, such that in certain cases freezing of the condensate cannot be prevented.

To ensure that the air in the heat exchanger does not cool too much, for example in the event of a variable load of the cool dryer, another already known approach consists of keeping the coolant temperature under control by providing the device with at least one bypass pipe across the compressor. A mechanical control valve in an aforementioned bypass pipe enables a certain quantity of coolant, in the form of hot gas, to be tapped off from the cooling circuit if need be, and to then be driven through the aforementioned bypass pipe across the compressor. In this way the cooling capacity of the device can be reduced and can prevent the condensate from freezing in the heat exchanger or the temperature of the coolant falling too greatly.

The mechanical control valve is hereby controlled by a control unit that is connected in a known way to one or more sensors, whereby these sensors determine the LAT.

When the aforementioned sensors register a lowest gas temperature (LAT), whereby freezing of the condensate can occur, the control unit sends a signal to a mechanical control valve to open the latter. In this way a certain quantity of coolant is guided across the compressor via an aforementioned bypass pipe so that the cooling capacity of the cooling circuit is decreased.

If the lowest gas temperature (LAT) is more than two to three degrees above zero, the mechanical control valve is closed so that the entire capacity of the cooling circuit is utilised to sufficiently cool the gas to be dried.

However, such known installations also present the disadvantage that the mechanical control valve can only be set to a completely open or completely closed state.

Consequently the supply of coolant and consequently the decrease of cooling capacity cannot be adjusted to the specific situation of the time or to the load at that moment.

A disadvantage of this is that it is possible for the coolant temperature to be increased too much such that the cooling capacity decreases too much and that the mechanical control valve is repeatedly opened and closed.

Moreover, due to the use of a mechanical control valve large fluctuations occur in the temperature of the coolant such that fluctuations occur in the dew point or the lowest gas temperature.

In the known method for cool drying, the aforementioned expansion means are controlled on the basis of measurements of the evaporator pressure and evaporator temperature.

As is known, the function of the expansion means consists of expanding just enough coolant so that the coolant always enters the cooling compressor with the desired degree of superheating.

Due to this superheating the liquid coolant present can be evaporated before being guided to the cooling compressor in order to give the cooling compressor optimum protection against liquid coolant.

The superheating of the coolant can be determined on the basis of the measurements of the evaporator pressure and the evaporator temperature, and it can be determined whether the expansion valve has to be opened more or less in order to be able to control the superheating of the coolant.

In order to make an accurate calculation of the superheating, both measurements must be done at exactly the same location. In this way a pressure loss in the cooling circuit and/or the bends of the cooling circuit has no effect on the pressure measurement.

The evaporator temperature is measured on the outside of the cooling circuit in a known way.

Such known installations thus present the disadvantage that the measurement is very slow and lags a possible change in the evaporator temperature.

This has the disadvantage that the calculation of the superheating is also slow and is not accurate as a change in the superheating is not immediately detected. As a result the expansion valve is not well controlled and not controlled quickly enough to control the superheating of the coolant.

SUMMARY OF THE INVENTION

The purpose of the present invention is to provide a solution to at least one of the aforementioned and other disadvantages.

The object of the present invention is a method for cool drying a gas whereby water vapour in the gas is condensed by guiding the gas through the secondary section of a heat exchanger whose primary section forms the evaporator of a closed cooling circuit in which a coolant can circulate by means of a compressor that is installed in the cooling circuit downstream from the evaporator and which is followed by a condenser and expansion means through which the coolant can circulate, whereby the cool dryer is characterised by a series of curves that show the setpoint for the evaporator temperature or evaporator pressure for a certain load of the cooling circuit as a function of the desired lowest gas temperature ($LAT_{set}$) whereby the method comprises the following steps:
- the determination of the evaporator temperature and/or the evaporator pressure;
- the determination of the loading of the cooling circuit;
- the determination of a corresponding curve as a function of the specific load, and for this curve the determination of the setpoint for the evaporator temperature or evaporator pressure that is required to be able to cool the gas to be dried to a desired lowest gas temperature ($LAT_{set}$);
- the control of a supply of coolant from the outlet of the compressor to an injection point in the cooling circuit downstream from the expansion means and upstream from the compressor in order to make the evaporator temperature or evaporator pressure equal or practically equal to the setpoint for the evaporator temperature or evaporator pressure.

In a method according to the invention a setpoint for the evaporator temperature or evaporator pressure is determined that is required to cool the gas supplied to a desired lowest gas temperature ($LAT_{set}$).

When the load changes due to a change of a parameter in the gas supplied, such as for example the flow, the humidity, the pressure or temperature, then the set point for the evaporator temperature or evaporator pressure that is required to cool the gas to the desired lowest gas temperature ($LAT_{set}$) also changes.

By opening or closing the electronic hot gas bypass valve more, the evaporator temperature or evaporator pressure can be increased or decreased respectively to ensure that the setpoint for the evaporator temperature or evaporator pressure is reached.

The foregoing also implies that no energy is unnecessarily consumed as the evaporator temperature or evaporator pressure is not maintained for any longer than strictly necessary.

It is clear that for a desired lowest gas temperature ($LAT_{set}$), the setpoint of the evaporator temperature or evaporator pressure increases as the cooling circuit is loaded less, or otherwise, as the flow of the gas to be dried decreases. In this way a method according to the invention makes use of a minimum of energy to cool a certain gas flow to a desired lowest gas temperature ($LAT_{set}$).

Another advantage is that the supply of coolant to the injection point using the electronic hot gas bypass valve can be infinitely adjusted between a minimum value, corresponding to no supply of coolant and a maximum value, corresponding to all or almost all of the coolant that is guided from the compressor outlet to the injection point.

This has the advantage that the evaporator temperature or evaporator pressure can be adjusted within a large range so that, irrespective of the load of the cooling circuit, the gas to be dried is always cooled to a desired lowest gas temperature ($LAT_{set}$), such that the freezing of condensate cannot occur.

As there is an unequivocal link between the evaporator temperature and the evaporator pressure, a measurement of one of the two is sufficient to determine the load in combination with the measured lowest gas temperature (LAT).

It is clear that the steps of the method according to the invention can be performed by a control unit or 'controller'.

Preferably the method comprises the step of determining the lowest gas temperature (LAT) of the gas to be dried, and to determine the load use is made of characteristic curves that each show the relationship between the lowest gas temperature (LAT) and the evaporator temperature or evaporator pressure at a certain load.

This has the advantage that the level of loading of the cooling circuit is determined on the basis of only two measurements, i.e. the lowest gas temperature (LAT) and the evaporator temperature or evaporator pressure. External data such as flow, temperature, pressure, relative humidity, free water and similar are not necessary to be able to adjust the cooling circuit to the load.

Such a method has the advantage that it can easily be implemented, for example by entering these curves in a controller beforehand.

Preferably the setpoint for the evaporator temperature or evaporator pressure is not selected below a preset value.

An advantage of this is that freezing cannot occur in the evaporator under any circumstances. It is possible that this preset value depends on the load of the cooling circuit.

Preferably the method comprises the following steps:
- the measurement of the evaporator temperature;
- the control of the expansion means on the basis of the measured evaporator temperature;

characterised in that the evaporator temperature is measured directly in the flow of the coolant.

An advantage is that this measurement is precise and there is no delay either.

This has the additional advantage that a change in the superheating can be detected immediately such that the expansion valve is adjusted quickly and accurately.

This has the result is that the desired superheating, i.e. the degree of superheating for which the coolant will be controlled can be chosen to be lower.

Preferably the desired superheating is kept as low as possible with a limited safety margin with respect to the saturation point of the coolant.

This means that the compressor has a lower outlet temperature such that the cooling system is more efficient and energy can be saved.

The present invention also concerns a device for cool drying a gas, whereby water vapour in the gas is condensed by cooling the gas, whereby this device is provided with a heat exchanger with a secondary section through which the gas to be dried is guided to cool the gas and with a primary section that forms the evaporator of a closed cooling circuit in which a coolant can circulate by means of a compressor downstream from the evaporator, whereby downstream between the compressor and the evaporator the cooling circuit successively comprises a condenser and expansion means through which the coolant can circulate, whereby the device is provided with a bypass pipe that connects the compressor outlet to an injection point in the cooling circuit between the expansion means and the compressor, whereby an electronic hot gas bypass valve is provided in this bypass pipe that is infinitely adjustable or adjustable in a number of steps.

An advantage is that the electronic hot gas bypass valve can be opened more or less. As a result the quantity of coolant that is injected via the bypass pipe can be adjusted on the basis of the lowest gas temperature (LAT) for example, the load of the cool dryer or the temperature of the coolant.

This has the additional advantage that the device is more stable and fewer large fluctuations occur in the temperature of the gas and the coolant.

Another advantage is that an electronic hot gas bypass valve enables the coolant to be injected into the cooling circuit again upstream from the heat exchanger outlet.

This has the advantage that the coolant flow supplied by the compressor is driven completely through the heat exchanger such that the oil backflow to the cooling compressor is always guaranteed.

As a result, the control of the heat exchanger during a partial load is more stable as a varying mixture of liquid and gaseous coolant can be used instead of a flow of exclusively liquid coolant.

Moreover, the hot gas that is injected in or before the heat exchanger will have more time to evaporate and heat the liquid coolant until the superheating measurement after the heat exchanger is performed, such that this measurement is more stable and more accurate.

Preferably the expansion means are formed by an electronic expansion valve that is adjustable.

Adjustable here means that the expansion valve can be adjusted in different steps between a minimum and maximum state or is infinitely adjustable between the aforementioned minimum and maximum state.

This has the advantage that the expansion of liquid coolant towards the evaporator can be dosed very accurately according to the load for example, such that a more stable device is obtained. The electronic expansion valve can be controlled on the basis of the aforementioned superheating measurement for example.

Moreover, the control range of an electronic expansion valve is larger than the conventional mechanical variant, such that the device can be used over a larger range of conditions.

Preferably means are provided to determine the evaporator temperature, whereby the aforementioned means are connected to a control unit for controlling the expansion means, characterised in that at least a measuring section of the means for measuring the evaporator temperature is affixed directly in the flow of the coolant.

This has the advantage that this measurement is accurate and moreover there is no delay.

The invention also concerns a method for cool drying a gas, whereby use is made of a device according to the invention and whereby the method comprises the following steps:
  the driving of the compressor;
  the determination of the lowest gas temperature (LAT) or the dew point of the gas in the secondary section of the heat exchanger and/or the determination of the temperature or pressure of the coolant in the evaporator;
  adjusting the electronic hot gas bypass valve, that is infinitely adjustable or adjustable in a number of steps, on the basis of this determination, for the injection of a suitable quantity of coolant from the compressor outlet to an injection point in the cooling circuit between the expansion means and the compressor in such a way that the lowest gas temperature (LAT) does not go below a certain preset value.

The advantages of the aforementioned method are similar to the advantages associated with a device according to the invention.

BRIEF DESCRIPTION OF THE DRAWINGS

With the intention of better showing the characteristics of the invention, a few preferred applications of the method for cool drying a gas according to the invention are described hereinafter by way of an example, without any limiting nature, with reference to the accompanying drawings, wherein.

DETAILED DESCRIPTION OF THE INVENTION

Figure 1:
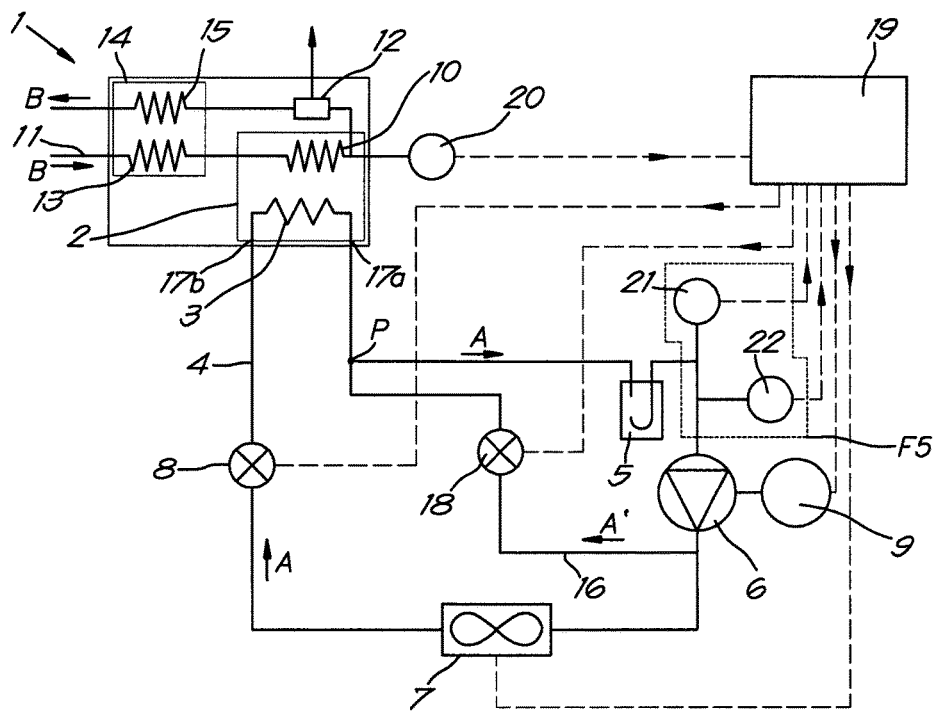
FIG. 1 schematically shows a device according to the invention for cool drying that can be used for applying a method according to the invention.

The device shown in FIG. 1 for cool drying essentially consists of a heat exchanger 2 whose primary section forms the evaporator 3 of a closed cooling circuit 4, in which a first liquid separator 5, a compressor 6, a condenser 7 and expansion means 8 are also placed in succession.

In this case the compressor 6 is driven by a motor 9 and is used to make a coolant circulate through the cooling circuit 4 according to arrow A. The compressor 6 can be a volumetric compressor for example, while the motor 9 is an electric motor for example.

The coolant can be R404a, but the invention is of course not limited as such.

In this case the expansion means 8 are, but not necessarily, formed by an electronic expansion valve that is adjustable. In this case the expansion valve 8 is infinitely adjustable between a minimum state and a maximum state.

The secondary section 10 of the heat exchanger 2 forms part of a pipe 11 for moist air to be dried whose direction of flow is indicated by arrow B. The entrance of this pipe 11 can be connected for example to an outlet of a compressor for the supply of compressed air to be dried or another gas to be dried originating from a compressor.

After the secondary section 10 of the heat exchanger 2, more specifically at its output, a second liquid separator 12 is installed in the pipe 11.

In this case a section 13 of this pipe 11, before it reaches the secondary section 10 of the heat exchanger 2, extends through a precooler or recovery heat exchanger 14. After the secondary section 10, a section 15 of this pipe 11 also extends through this recovery heat exchanger 14, with the opposite flow direction to the aforementioned section 13.

The output of the aforementioned pipe 11 can be connected for example to a compressed air network (not shown in the drawings) to which compressed air consumers are connected, such as tools that are driven by compressed air.

In this case the compressor 6 is bypassed by one bypass pipe 16 that connects the outlet of the compressor 6 to the injection point P, which in this case is located downstream from the outlet 17a of the evaporator 3.

The bypass pipe 16 is constructed with an electronic hot gas bypass valve 18 for tapping off coolant from the cooling circuit 4.

In this case the electronic hot gas bypass valve 18 is infinitely adjustable between a minimum or closed state and a maximum state whereby it is fully open.

The electronic hot gas bypass valve 18 is connected to a control unit 19 to which in this case a number of means 20, 21 and 22 are also connected to determine the temperature and/or pressure of the gas and/or the coolant.

First means 20 are positioned in the secondary section 10 of the heat exchanger 2 to determine the lowest gas temperature (LAT).

Second means 21 and third means 22 are installed after the evaporator 3 for determining the evaporator temperature $T_{evaporator}$ and the evaporator pressure $p_{evaporator}$ respectively of the coolant in the evaporator 3.

It is clear that it is not necessary for both means 21 and 22 to be present in view of the unequivocal link between the evaporator temperature $T_{evaporator}$ and the evaporator pressure $p_{evaporator}$.

It is also clear that not all means 20, 21 and 22 necessarily have to be present and that these means can be implemented in different ways.

The control unit 19 is also connected to the condenser 7, the expansion valve 8, and the motor 9 for the control thereof.

The method for cool drying by means of a device 1 according to FIG. 1 is very simple and as follows.

The air to be dried is carried through the pipe 11 and thus through the secondary section 10 of the heat exchanger 2 according to arrow B.

In this heat exchanger 2 the moist air is cooled under the influence of the coolant that flows through the primary section of the heat exchanger 2, or thus the evaporator 3 of the cooling circuit 4.

As a result condensate is formed that is separated in the second liquid separator 12.

The cold air that contains less moisture in absolute terms after this second liquid separator 12, but still has a relative humidity of 100%, is heated in the recovery heat exchanger 14 under the influence of the newly supplied air to be dried, such that the relative humidity falls to preferably below 50%, while the new air to be dried is already partially cooled in the recovery heat exchanger 14 before being carried to the heat exchanger 2.

The air at the output of the recovery heat exchanger 14 is thus drier than at the input of the heat exchanger 2.

To enable cooling of the moist air to be cooled in the secondary section 10 of the heat exchanger, the coolant is guided through the cooling circuit in the direction of arrow A through the evaporator 3 or the primary section of the heat exchanger 2.

The hot coolant that comes out of the evaporator 3 is in the gas phase and will be raised to a higher pressure by the compressor 6, then cooled in the condenser 7 and condensed.

The liquid cold coolant will then be expanded by the expansion valve 8 and will cool further, before being driven to the evaporator 3 to cool the air to be dried there.

Under the influence of heat transfer the coolant will warm up in the evaporator 3, evaporate and again be guided to the compressor 6.

Any liquid coolant still present after the evaporator 3 will be held back by the first liquid separator 5.

In order to prevent freezing of the condensate, the compressed air supplied is not cooled to below 2 to 3° C. in the heat exchanger 2.

The method according to the invention cools the compressed air supplied to a desired lowest gas temperature $LAT_{set}$ by determining a setpoint for the evaporator temperature $T_{set}$ or the evaporator pressure $p_{set}$ and controlling the electronic hot gas bypass valve in such a way that the evaporator temperature $T_{evaporator}$ or evaporator pressure $p_{evaporator}$ is equal or practically equal to the aforementioned setpoint $T_{set}$ or $p_{set}$.

This is done by determining the load C of the cooling circuit 4 in a first step.

In this case the load C is determined by the control unit 19 in which a number of characteristic curves are stored that each give the link between the lowest gas temperature LAT and, in this case, the evaporator temperature $T_{evaporator}$ at a specific load C.

Such characteristic curves can be determined experimentally. A possible but not limiting formula that shows the link can be for example:

$$T_{20} = (LAT - A)/S + B + C;$$

where B and S are parameters that are determined by the coolant and A is a preset value.

From the signals from the means 20 and the means 21 the control unit can determine which characteristic curve the device 1 is on and thus the load C.

Figure 2:
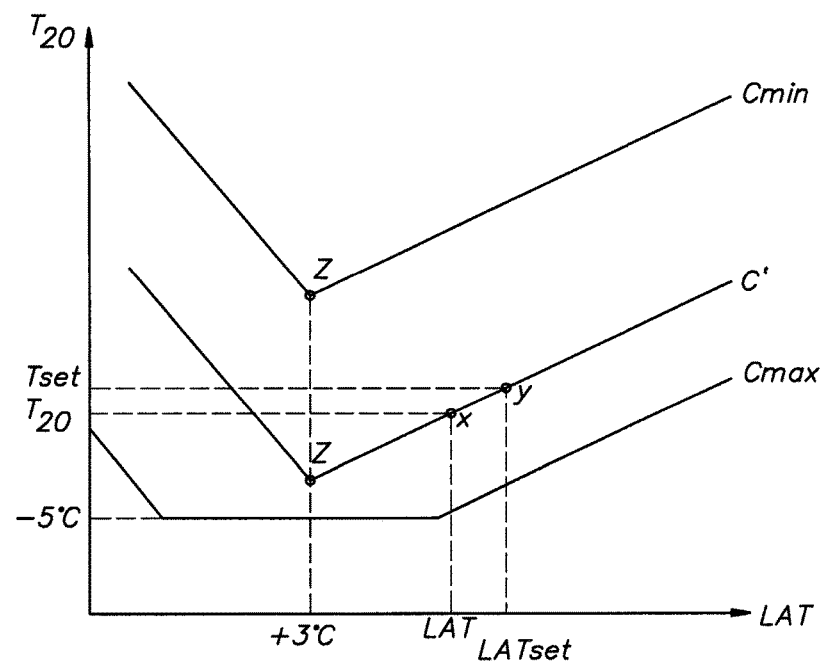
FIG. 2 shows a setpoint for the evaporator temperature that is calculated with a method according to the invention in order to cool the gas to be dried to a desired lowest gas temperature ($LAT_{set}$)

A series of curves are also stored in the control unit 19 that show, for a certain load C of the cooling circuit 4, the set point for the evaporator temperature $T_{evaporator}$ as a function of the desired lowest gas temperature $LAT_{set}$-FIG. 2 shows a number of such curves as a non-exhaustive example.

The top curve $C_{min}$ corresponds to the lowest possible load C of the cooling circuit 4, the bottom curve $C_{max}$ is used for when the load C is a maximum.

The curves C' between the top curve $C_{min}$ and the bottom curve $C_{max}$ are calculated for a load C that varies between the minimum and maximum load C of the cooling circuit 4.

On the basis of the determined load C and the measured lowest gas temperature LAT and the evaporator temperature $T_{evaporator}$ the means 20 or 21 respectively can determine on which curve and at what setpoint on the curve the device is at that time. In the example of FIG. 2, the device 1 is at the point X of the curve C'.

When the control unit 18 has determined the applicable curve C' at that time, the control unit 19 will determine the setpoint for the evaporator temperature $T_{set}$ on the basis of the specified desired lowest gas temperature $LAT_{set}$.

In FIG. 2 this is shown by the point Y with a desired lowest gas temperature $LAT_{set}$.

A setpoint for the evaporator temperature $T_{set}$ corresponds to this desired lowest gas temperature $LAT_{set}$.

Then on the basis of the difference between $T_{evaporator}$ and $T_{set}$ the control unit 19 will control the electronic hot gas bypass valve 18 and in this case open the valve 18 more so that more coolant can flow via the bypass pipe 16 to the injection point P according to the arrow A'.

In this way $T_{evaporator}$ will rise until it is equal or practically equal to the set point $T_{set}$, such that the cooling circuit 4 will cool the compressed air until it has a lowest gas temperature LAT that corresponds to $LAT_{set}$.

Preferably the control unit 19 determines the load periodically according to a preset time interval.

This has the advantage that fluctuations or changes in the load C can be accommodated because the control unit 19 will ensure that the electronic hot gas bypass valve 18 will be opened more or less when it is found, during a subsequent time interval, that the load C and thus the setpoint for the evaporator temperature $T_{set}$ has changed.

The shape of the curves of FIG. 2, that are used to determine the setpoint for the evaporator temperature $T_{set}$, can be determined experimentally and depends on the properties of the coolant used and the cooling circuit 4 and the device 1.

Preferably the curves are described by means of the following formula:

$$T_{set} = \text{Max}(B,(LAT_{set}-A)/S+B+C).$$

Here B and S are parameters that are determined by the coolant. A is a preselected parameter, and in the example of FIG. 2 is set at 3° C.

The above formula applies when the lowest gas temperature LAT is greater than A.

When the measured lowest gas temperature LAT is less than A, or in this case 3° C., then the curve has the following formula:

$$T_{set} = (LAT-A)/S+B+\text{maximum}(0,C);$$

such that the curve presents a kink at the level of the point Z corresponding to LAT=3° C.

When the measured lowest gas temperature LAT is lower than A, the curve will rise, such that a higher setpoint for the evaporator temperature $T_{set}$ is determined by the control unit 19. In this way the lowest gas temperature LAT will not fall further, such that freezing of the condensate will be prevented.

As can be seen in FIG. 2, the bottom curve is bounded underneath such that under no circumstances can the setpoint for the evaporator temperature $T_{evaporator}$ be lower than a minimum permissible evaporator temperature, which in this case is set equal to −5° C. In this way freezing in the heat exchanger is prevented.

Although in the example described use was made of curves and formulae that show the link between the evaporator temperature $T_{evaporator}$ and the lowest gas temperature LAT, it is not excluded that use is made of analogous curves and formulae that show the relationship between the evaporator pressure $p_{evaporator}$ and the lowest gas temperature in view of the unequivocal link between the evaporator temperature $T_{evaporator}$ and the evaporator pressure $p_{evaporator}$.

For the same reason, in order to determine the load C it is also possible to make use of characteristic curves that show the relationship between the evaporator pressure $p_{21}$ and the lowest gas temperature LAT instead of between the evaporator temperature $T_{evaporator}$ and the lowest gas temperature LAT.

An alternative method according to the invention for cool drying by means of a device 1 according to FIG. 1 is very simple and as follows.

As already stated, to prevent freezing of the condensate in the heat exchanger 2, the air in the heat exchanger 2 is not cooled to below the LAT, whereby this LAT is typically 2 to 3° C., or 20° C. below ambient temperature.

However, if the LAT is too high there is insufficient cooling and thus insufficient moisture is condensed for the air to be sufficiently dried.

The aforementioned LAT conditions are satisfied by the control unit 19 controlling the electronic hot gas bypass valve 18 on the basis of the lowest gas temperature LAT determined by the means 20, such that a certain quantity of coolant is driven through the bypass pipe 16 across the compressor 6 according to arrow A'. In this way the cooling capacity of the cooling circuit 4 can be varied or set and the LAT adjusted to the desired level.

The quantity of coolant that is injected can be adjusted by opening the electronic hot gas bypass valve 18 more or less, such that the suitable quantity is injected so that large fluctuations in the LAT can be prevented. As a result, variations in the load of the device 1 can be accommodated and large fluctuations prevented.

In this case the control unit 18 can also control the electronic hot gas bypass valve 18 on the basis of the temperature $T_{evaporator}$ or pressure $p_{evaporator}$ respectively of the coolant in the evaporator 3, as determined by the means 21 and 22.

The control unit 19 will preferably apply such a control at zero load, i.e. when no or only minimal gas to be dried goes through the heat exchanger in order to prevent freezing of the evaporator 3.

Indeed, at zero load the temperature of the coolant is too low, typically below −5° C., after which the electronic hot gas bypass valve 18 is placed in an open state and the temperature of the coolant will rise.

In this way at zero load this prevents the temperature of the coolant becoming too low and freezing occurring in the evaporator 3 because hot gaseous coolant is injected in the evaporator 3.

In the example of FIG. 1 the injection point P is downstream from outlet 17a of the evaporator 3.

However, this injection point P can be located anywhere downstream from the expansion valve 8 and upstream from the compressor 6.

Because the electronic hot gas bypass valve 18 is infinitely adjustable, it is also possible for example to place the injection point P upstream from the outlet 17a of the evaporator 3, or even upstream from the inlet 17b of the evaporator 3.

Figure 3:
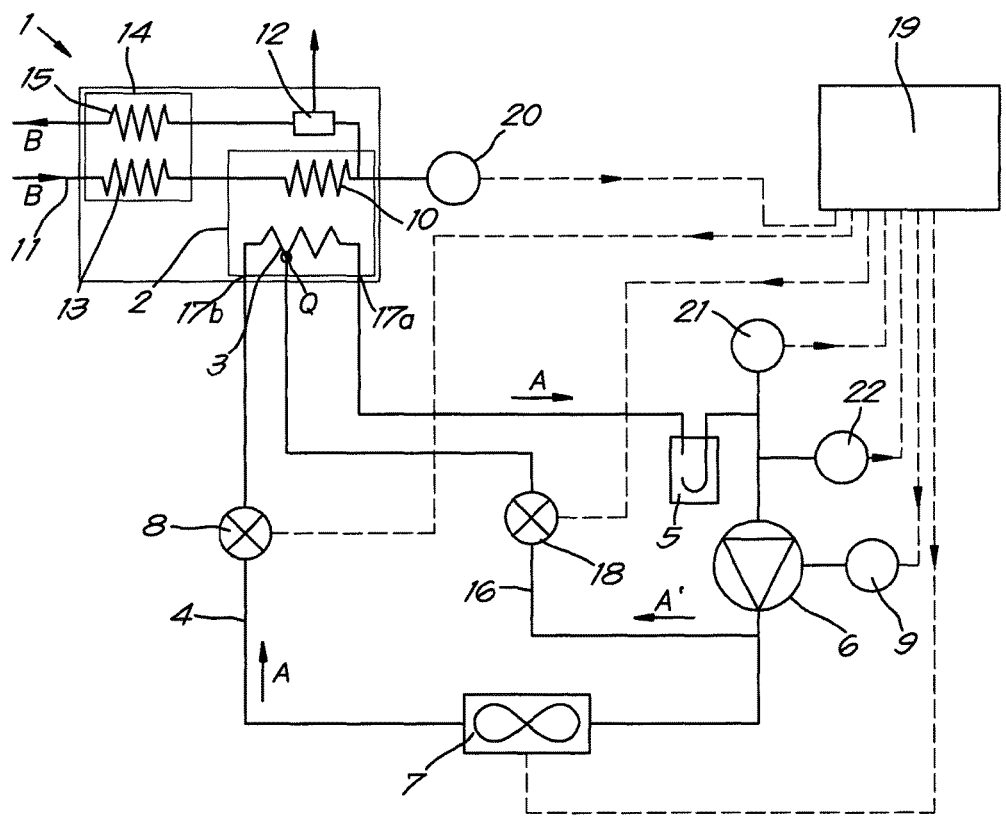
FIGS. 3 and 4 show alternative embodiments of the device of FIG. 1.

FIG. 3 shows a variant of FIG. 1, whereby in this case the bypass pipe 16 connects the compressor 6 outlet to point Q that is located upstream from the outlet 17a of the evaporator 3, but after the inlet 17b of the evaporator 3. The operation of the device 1 is further analogous to the embodiment described above.

Figure 4:
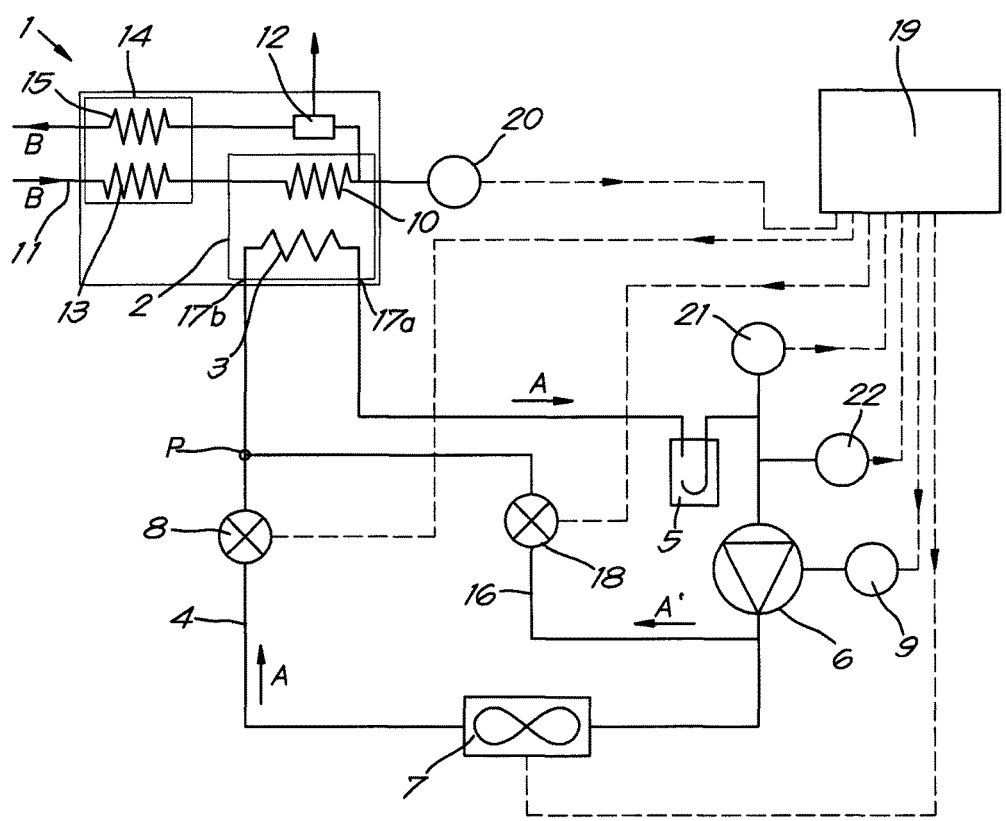

FIG. 4 shows another variant, whereby in this example the bypass pipe 16 connects the compressor 6 outlet to an injection point P that is located upstream from the inlet 17b of the evaporator 3, but downstream from the expansion valve 8.

Because the coolant is injected at injection point P before the evaporator by means of the bypass pipe 16, the hot gas will have time to evaporate the liquid coolant in the evaporator 3. This means that the determination of $T_{evaporator}$ and/or $p_{evaporator}$ will be fast and accurate such that the electronic hot gas bypass valve 18 can be quickly and precisely controlled.

Figure 5:
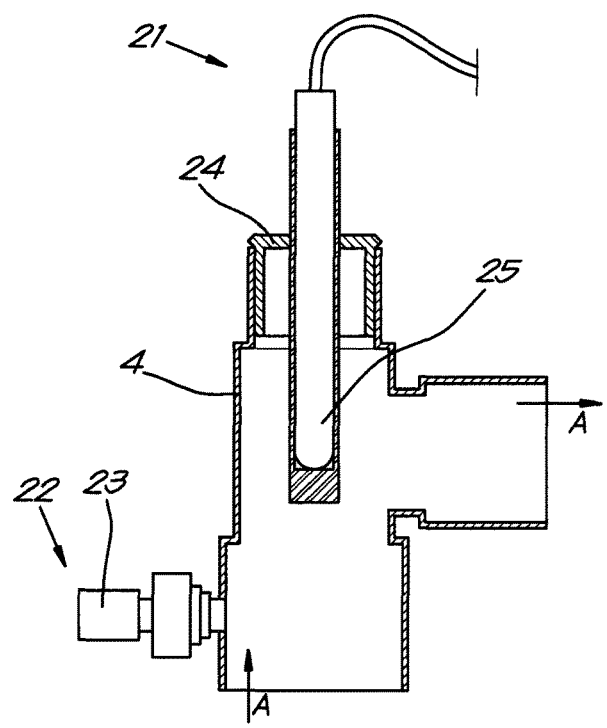
FIG. 5 schematically shows the section indicated by F5 in FIG. 1 on a larger scale.

FIG. 5 shows a preferred embodiment in more detail of the means 21 to determine the evaporator temperature $T_{evaporator}$ and the means 22 to determine the evaporator pressure $p_{evaporator}$. Both the means 21 and the means 22 are affixed in the cooling circuit 4, downstream from the evaporator 3. Although in FIGS. 1, 3 and 4 they are situated downstream from the first liquid separator 5, it is also possible that these means 21 and 22 are upstream from the first liquid separator 5 and downstream from the evaporator 3.

The means 22 for measuring the evaporator pressure $p_{evaporator}$ can be a pressure sensor 23 for example, and the means 21 for measuring the evaporator temperature $T_{evaporator}$ can be a temperature sensor 24 for example.

In this embodiment the means 21 for measuring the evaporator temperature $T_{evaporator}$ are affixed directly in the flow of the coolant so that the means 21 can measure the temperature in the coolant flow.

Both sensors 23, 24 are affixed at the level of a bend in the cooling circuit 4 so that both the evaporator temperature $T_{evaporator}$ and evaporator pressure $p_{evaporator}$ are measured at the same location.

The temperature sensor 24 has a measuring section 25 that is affixed in the cooling circuit 4 in the flow of the coolant so that the measuring section 25 can directly measure the temperature of the coolant in the coolant flow.

Hereby the control unit 19 of the device 1 will be connected to the pressure sensor 23 and the temperature sensor 24.

The control unit 19 will, in addition to controlling the motor 9, the expansion valve 8, the condenser 7 and the hot gas bypass valve 18, also read out the measured evaporator pressure $p_{evaporator}$ and evaporator temperature $T_{evaporator}$ and calculate the superheating of the coolant on the basis of this.

As already stated above, if necessary a quantity of coolant can be driven through the bypass pipe 16 according to arrow A' across the compressor 6 using the hot gas bypass valve 18, so that the cooling capacity of the cooling circuit 4 can be varied or set, taking account of variations in the load of the device 1. In this way large fluctuations will be prevented and condensate freezing in the heat exchanger can also be prevented due to the air in the heat exchanger 2 being cooled too greatly.

To ensure that as much of the coolant as possible can evaporate, the expansion valve 8 will be adjusted by the control unit 19 such that the correct quantity of coolant is expanded so that the desired superheating of the coolant is obtained at the input of the compressor 6 so that any liquid coolant still present after the heat exchanger 2 can evaporate.

The control by the control unit 19 is done on the basis of the measurements of the pressure sensor 23 and temperature sensor 24 of the evaporator pressure $p_{evaporator}$ and evaporator temperature $T_{evaporator}$ respectively.

More specifically the control unit 19 will adjust the desired superheating to so as to obtain the lowest possible superheating.

Because the measuring section 25 of the temperature sensor is in the coolant flow, the measurements of the evaporator temperature $T_{evaporator}$ will be fast and accurate. As a result the control unit 19 can determine the superheating of the coolant quickly and accurately and consequently can also quickly and accurately adjust the expansion valve 8. As a result only a limited safety margin with respect to the saturation point of the coolant is required, whereby the coolant is preferably superheated by less than 15° C., and even better by less than 10° C.

This means that the compressor 6 has a lower outlet temperature such that the cooling system is more efficient and energy can be saved.

Figure 6:
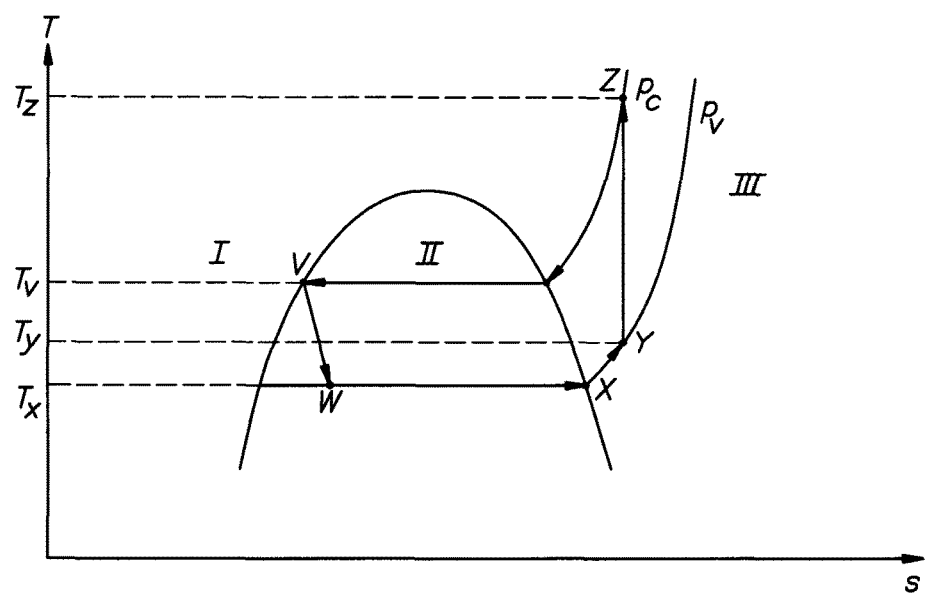
FIG. 6 schematically shows a T-s diagram of the coolant.

FIG. 6 schematically shows a T-s diagram of the coolant freon R404a. Three zones are distinguished between: in zone I the coolant is liquid, in zone II the coolant is both gaseous and liquid, and in zone III the coolant is gaseous.

The V-W-X-Y-Z cycle shows the cooling cycle of the coolant that the coolant follows when flowing through the cooling circuit 4. The curve $p_v$ shown applies at the evaporator pressure $p_{evaporator}=p_v$ and the curve $p_c$ applies at the compressor pressure $p=p_c$.

After the compressor 6 the coolant is at the point Z of FIG. 3, is gaseous, has a pressure $p_c$ and a temperature $T_z$.

When it then flows through the condenser 7 it will cool to a temperature $T_v$, whereby the coolant is liquid. Here the curve $p_c$ is followed from point Z to point V.

When the coolant flows through the expansion valve 8 it will expand to a pressure $p_v$. The coolant hereby follows the cooling cycle from point V to point W located in zone II.

In the evaporator 3 the coolant will absorb heat, such that the liquid coolant present will evaporate. The coolant will hereby follow the curve $p_v$ towards the right in the direction of point X.

When this saturation point X is reached, corresponding to the temperature $T_x$, all the liquid coolant will have evaporated.

To ensure that the compressor 6 is protected against drawing in liquid coolant, it must be ensured that the coolant in the evaporator 3 can absorb enough heat so that it can pass the point X on the curve $p_v$, for example up to the point Y corresponding to a temperature $T_y$. In other words the coolant is then in the zone III and is thus gaseous and superheated.

In this case by suitably controlling the expansion valve 8 the control unit 19 can set the superheating to the temperature $T_y$ with a maximum safety margin of 15° C. with respect to $T_x$, as the measurement of the superheating of the coolant can be done quickly and accurately such that only a small safety margin is required.

Indeed, because the temperature measurement of the evaporator temperature $T_{evaporator}$ is fast and accurate, the control unit 19 can also quickly determine the superheating of the coolant and on the basis of this control the expansion valve 8 so that the desired superheating of the coolant can be preserved.

It is clear that the control of the expansion valve 8 on the basis of the measurements of the pressure sensor 23 and temperature sensor 24 to set the desired superheating as low as possible, can also be applied in other devices 1, in particular in devices without a bypass pipe 16 with an electronic hot gas bypass valve 18.

Although in the example shown the device 1 is provided with only one heat exchanger 2, it is clear that a number of heat exchangers 2 are also provided.

It is also clear that, although in the examples described above, the gas to be dried is compressed air, every gas or mixture of gases can be dried using a device 1 or method according to the invention.

The invention also concerns a method for cool drying gas whereby water vapour in the gas is condensed, by guiding the gas through the secondary section 10 of a heat exchanger 2 whose primary section forms the evaporator 3 of a closed cooling circuit 4 in which a coolant can circulate by means of a compressor 6 that is placed in the cooling circuit after the evaporator 3 and which is followed by a condenser 7 and expansion means 8 through which the coolant can circulate, whereby the method comprises the following steps:

the measurement of the evaporator temperature $T_{evaporator}$;
the control of the expansion means 8 on the basis of the measured evaporator temperature $T_{evaporator}$;

whereby the evaporator temperature $T_{evaporator}$ is measured directly in the coolant flow.

Preferably in addition to the evaporator temperature $T_{evaporator}$ the evaporator pressure $p_{evaporator}$ is also measured and the expansion means 8 are controlled on the basis of the evaporator temperature $T_{evaporator}$ and the evaporator pressure $p_{evaporator}$, whereby the evaporator temperature $T_{evaporator}$ and the evaporator pressure $p_{evaporator}$ are measured at the same location in the cooling circuit.

According to a preferred variant the expansion means 8 are controlled to obtain the desired superheating of the coolant at the input of the compressor 6.

Preferably the expansion means 8 are formed by an electronic expansion valve 8 that is controlled as a function of the measured evaporator temperature $T_{evaporator}$ and evaporator pressure $p_{evaporator}$ to obtain the desired superheating.

In another preferred variant the desired superheating is set in a control unit 19 that is set to realise the lowest possible superheating, whereby preferably the coolant is superheated by less than 15° C., and even better by less than 10° C.

Preferably the gas to be dried originates from a compressor.

The invention also concerns a device for cool drying a gas, whereby water vapour in the gas is condensed by cooling the gas, whereby this device 1 is provided with a heat exchanger 2 with a secondary section 10 through which the gas to be dried is guided to cool the gas, and with a primary section that forms the evaporator 3 of a closed cooling circuit 4 in which a coolant can circulate, whereby after the evaporator 3 the cooling circuit successively comprises a compressor 6 for the circulation of the coolant, a condenser 7 and expansion means 8 through which the coolant can circulate, whereby means 21 are provided to determine the evaporator temperature $T_{evaporator}$ whereby the aforementioned means 21 are connected to a control unit 19 for controlling the expansion means 8, whereby at least a measuring section 25 of the means 21 for measuring the evaporator temperature $T_{evaporator}$ is affixed directly in the coolant flow.

In a preferred embodiment, means 22 are provided to determine the evaporator pressure evaporator that are at the same location in the cooling circuit 4 as the means 21 for determining the evaporator temperature $T_{evaporator}$ whereby the aforementioned means 22 are connected to the control unit 19 to control the expansion means 8 on the basis of the measured evaporator temperature $T_{evaporator}$ and the evaporator pressure $p_{evaporator}$.

Preferably the control unit 19 is such that the expansion means 8 are controlled to obtain the desired superheating of the coolant at the compressor 6 input.

Preferably the expansion means 8 are formed by an electronic expansion valve 8, whereby the control unit 19 is such that the electronic expansion valve 8 is controlled as a function of the measured evaporator temperature $T_{evaporator}$ and evaporator pressure $p_{evaporator}$ to obtain the desired superheating.

In another preferred embodiment the control unit 19 sets the desired superheating to realise the lowest possible superheating, whereby the coolant is preferably superheated by less than 15° C., and even better by less than 10° C.

Preferably the gas to be dried originates from a compressor.

The present invention is by no means limited to the embodiments described as an example and shown in the drawings, but such a method can be realised in different variants without departing from the scope of the invention.

The invention claimed is:

1. A method for cool drying a gas using a cool dryer whereby water vapour in the gas is condensed by guiding the gas through a secondary section of a heat exchanger whose primary section forms an evaporator of a closed cooling circuit in which a coolant is able to circulate by means of a compressor that is installed in the cooling circuit downstream from the evaporator and which is followed by a condenser and expansion means through which the coolant is able to circulate, whereby the cool dryer comprises a control unit configured to store a series of curves that show a setpoint for an evaporator temperature or evaporator pressure for specific load of the cooling circuit as a function of a desired lowest gas temperature, comprising the following steps: determining the evaporator temperature and/or the evaporator pressure using a temperature sensor or a pressure sensor, respectively; determining a load of the cooling circuit; using a curve that is a function of the specific load, to determine the setpoint for the evaporator temperature or the evaporator pressure that is required to be able to cool the gas to be dried to the desired lowest gas temperature; setting the setpoint of the determined evaporator temperature or the evaporator pressure to control an opening and a closing of a bypass valve in a bypass line that connects an outlet of the compressor to an injection point in the cooling circuit downstream from the expansion means and upstream from the compressor to control a supply of coolant from the outlet of the compressor to the injection point in order to make the evaporator temperature or the evaporator pressure equal to the setpoint for the evaporator temperature or the evaporator pressure.

2. The method according to claim 1, wherein the electronic hot gas bypass valve is controlled on the basis of the difference between the evaporator temperature or evaporator pressure and the setpoint for the evaporator temperature or the evaporator pressure.

3. The method according to claim 2, wherein the injection point is located upstream from the outlet of the evaporator.

4. The method according to claim 3, wherein the injection point is located upstream from the inlet of the evaporator.

5. The method according to claim 1, wherein the method comprises the step of determining the lowest gas temperature of the gas to be dried, and that, to determine the load, use is made of characteristic curves that each show the relationship between the lowest gas temperature and the evaporator temperature or evaporator pressure with the specific load.

6. The method according to claim 1, wherein when the lowest gas temperature of the gas to be dried is less than the preset value, the aforementioned curves, which show the desired lowest gas temperature, for the specific load of the cooling circuit, as a function of the setpoint for the evaporator temperature or the evaporator pressure, are determined by the following formula: Tset=(LAT−A)/S+B+maximum (O,C); whereby B and S are parameters that are selected based on the liquid coolant.

7. The method according to claim 1, wherein the expansion means are formed by an electronic expansion valve that is adjustable.

8. The method according to claim 1, wherein the gas to be dried originates from the compressor.

9. The method according to claim 1, wherein the method comprises the following steps:
   the measurement of the evaporator temperature;
   the control of the expansion means on the basis of the measured evaporator temperature;

whereby the evaporator temperature is measured directly in the coolant flow.

10. The method according to claim 9, wherein in addition to the evaporator temperature, the evaporator pressure is also measured and that the expansion means are controlled on the basis of the evaporator temperature and the evaporator pressure, whereby the evaporator temperature and the evaporator pressure are measured at the same location in the cooling circuit.

11. The method according to claim 9, wherein the expansion means are controlled to obtain the desired superheating of the coolant at the compressor input.

12. The method according to claim 11, wherein the expansion means are formed by an electronic expansion valve that is controlled as a function of the measured evaporator temperature and evaporator pressure to obtain the desired superheating.

13. The method according to claim 11, wherein the desired superheating is set in a control unit that is set to be as low as possible to realize the superheating, whereby the coolant is preferably superheated by less than 15° C., and even better by less than 10° C.

14. A method for cool drying a gas using a cool dryer whereby water vapour in the gas is condensed by guiding the gas through a secondary section of a heat exchanger whose primary section forms an evaporator of a closed cooling circuit in which a coolant is able to circulate by means of a compressor that is installed in the cooling circuit downstream from the evaporator and which is followed by a condenser and expansion means through which the coolant is able to circulate, whereby the cool dryer comprises a control unit configured to store a series of curves that show a setpoint for an evaporator temperature or evaporator pressure for a specific load of the cooling circuit as a function of a desired lowest gas temperature, comprising the following steps: determining the evaporator temperature and/or the evaporator pressure using a temperature sensor or a pressure sensor, respectively; determining a load of the cooling circuit; using a curve that is a function of the specific load, to determine the setpoint for the evaporator temperature or the evaporator pressure that is required to be able to cool the gas to be dried to the desired lowest gas temperature: controlling a supply of coolant from the outlet of the compressor to the injection point in the cooling circuit downstream from the expansion means and upstream from the compressor in order to make the evaporator temperature or the evaporator pressure equal to the setpoint for the evaporator temperature or the evaporator pressure, wherein when the lowest gas temperature of the gas to be dried is greater that a preset value of at least 3° C., the aforementioned curves, which show the desired lowest gas temperature for the specific load of the cooling circuit as a function of the setpoint for the evaporator temperature or the evaporator pressure, are determined by the following formula: Tset=Max (B,(LATsetA)/S+B+C); whereby B and S are parameters that are selected based on the liquid coolant.

15. A device for cool drying a gas, whereby water vapour in the gas is condensed by cooling the gas, whereby the device comprises a heat exchanger with a secondary section through which the gas to be dried is guided to cool the gas and with a primary section that forms an evaporator of a closed cooling circuit in which a coolant is able to circulate by means of a compressor downstream from the evaporator, whereby downstream between the compressor and the evaporator the cooling circuit successively comprises a condenser and expansion means through which the coolant is able to circulate, comprising: means to determine an evaporator temperature and/or an evaporator pressure using a temperature sensor or a pressure sensor, respectively, whereby the aforementioned means are connected to a control unit for controlling the expansion means, the control unit is configured to store a series of characteristic curves that show a setpoint for the evaporator temperature or the evaporator pressure for a specific load of the cooling circuit as a function of a desired lowest gas temperature, said control unit being further configured to use a curve that is a function of the specific load, to determine the setpoint for the evaporator temperature or the evaporator pressure that is required to be able to cool the gas to be dried to the desired lowest gas temperature and configured to set the determined setpoint for the evaporator temperature or the evaporator pressure, and the device is further provided with a bypass pipe that connects the compressor outlet to an injection point in the cooling circuit, downstream from the expansion means and upstream from the compressor in order to make the evaporator temperature or the evaporator pressure equal to the setpoint for the evaporator temperature or the evaporator pressure, wherein an electronic hot gas bypass valve is provided in this bypass pipe that is adjustable or adjustable in a number of steps based on the setpoint for the evaporator temperature or the evaporator pressure.

16. The device according to claim 15, wherein the aforementioned injection point is located upstream from the outlet of the evaporator.

17. The device according to claim 16, wherein the aforementioned injection point is located upstream from the inlet of the evaporator.

18. The device according to claim 15, wherein the control unit controls the electronic hot gas bypass valve as a function of signals received from means to determine the temperature and/or the pressure of the gas and/or the coolant.

19. The device according to claim 18, wherein the aforementioned means at least comprise means for determining the 'lowest gas temperature' or the dew point of the gas in the secondary section of the heat exchanger and/or at least comprise means for determining the temperature or the pressure of the coolant in the evaporator.

20. The device according to claim 15, wherein the expansion means are formed by an electronic expansion valve that is adjustable.

21. The device according to claim 15, wherein it is applied in a method.

22. A method for cool drying a gas, whereby use is made of the device according to claim 15, comprising the following steps: driving the compressor; determining the lowest gas temperature or the dew point of the gas in the secondary section of the heat exchanger and/or determining the temperature or pressure of the coolant in the evaporator; adjusting the electronic hot gas bypass valve, that is adjustable or adjustable in a number of steps, on the basis of this determination, for the injection of a coolant from the compressor outlet to the injection point in the cooling circuit between the expansion means and the compressor so that the lowest gas temperature does not go below a preset value of at least 3° C.

23. The device according to 15, wherein at least a measuring section of the means to measure the evaporator temperature is affixed directly in the coolant flow.

24. The device according to claim 23, wherein the means provided to determine the evaporator pressure that are at the same location in the cooling circuit as the means to determine the evaporator temperature, whereby the aforementioned means are connected to the control unit for controlling the expansion means on the basis of the measured evaporator temperature and the evaporator pressure.

25. The device according to claim 23, wherein the control unit is such that the expansion means are controlled to obtain the desired superheating of the coolant at the compressor input.

26. The device according to claim 25, wherein the expansion means are formed by an electronic expansion valve, whereby the control unit is such that the electronic expansion valve is controlled as a function of the measured evaporator temperature and evaporator pressure to obtain the desired superheating.

27. The device according to claim 25, wherein the control unit sets the desired superheating to realize the lowest possible superheating, whereby the coolant is preferably superheated by less than 15° C., and even better by less than 10° C.

28. A The device according to claim 23, wherein the gas to be dried originates from the compressor.

* * * * *